(12) United States Patent
Zhao et al.

(10) Patent No.: US 6,799,213 B1
(45) Date of Patent: Sep. 28, 2004

(54) SYSTEM AND METHOD FOR PERFORMING INTERACTIVE SERVER LOAD TESTING THROUGH USE OF ONE OR MORE VIRTUAL USERS BEING CONFIGURED AS A SERVER CLIENT CAPABLE OF TRANSMITTING ONE OR MORE SERVER TEST ACTIONS

(75) Inventors: Yunxiang Zhao, Flower Mound, TX (US); Adnan Ghaffar, Richardson, TX (US); Randy I. Stone, Richardson, TX (US)

(73) Assignee: Sprint Communications Company, L.P., Overland Park, KS (US)

( * ) Notice: Subject to any disclaimer, the term of this patent is extended or adjusted under 35 U.S.C. 154(b) by 744 days.

(21) Appl. No.: 09/651,918

(22) Filed: Aug. 31, 2000

(51) Int. Cl.[7] .................. G06F 15/173; G06F 11/00
(52) U.S. Cl. ........................... 709/224; 714/47
(58) Field of Search ................. 714/4, 46–47; 703/21; 707/203; 709/224; 702/186

(56) References Cited

U.S. PATENT DOCUMENTS

| | | | | |
|---|---|---|---|---|
| 4,853,843 A | * | 8/1989 | Ecklund | 707/203 |
| 5,974,572 A | * | 10/1999 | Weinberg et al. | 714/47 |
| 6,230,196 B1 | * | 5/2001 | Guenthner et al. | 709/223 |
| 6,360,332 B1 | * | 3/2002 | Weinberg et al. | 714/4 |
| 6,449,739 B1 | * | 9/2002 | Landan | 714/47 |
| 6,477,483 B1 | * | 11/2002 | Scarlat et al. | 702/186 |
| 6,549,882 B1 | * | 4/2003 | Chen et al. | 703/21 |
| 6,549,944 B1 | * | 4/2003 | Weinberg et al. | 709/224 |
| 6,578,188 B1 | * | 6/2003 | Pang et al. | 716/19 |
| 6,587,969 B1 | * | 7/2003 | Weinberg et al. | 714/46 |

OTHER PUBLICATIONS

Website of Mercury Interactive, LoadRunner—The Industry–Standard Load Testing Tool, 2001.

* cited by examiner

Primary Examiner—Rupal Dharia
Assistant Examiner—Quang Nguyen

(57) ABSTRACT

A client server load testing system provides a software and hardware infrastructure facilitating the use of an engine that generates a plurality of virtual clients or virtual users. These virtual users are provided with scenarios representing an online user session with the server under test by the action of a message building agent that populates the scenario with test data.

19 Claims, 5 Drawing Sheets

SYSTEM AND METHOD FOR PERFORMING INTERACTIVE SERVER LOAD TESTING THROUGH USE OF ONE OR MORE VIRTUAL USERS BEING CONFIGURED AS A SERVER CLIENT CAPABLE OF TRANSMITTING ONE OR MORE SERVER TEST ACTIONS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The present invention pertains to the field of data communications and, more specifically, the data communications used in testing client/server architecture. Virtual users are created to test server responses under conditions that simulate an actual load under use.

2. Description of the Prior Art

Telecommunications and software companies are constantly developing new client/server system applications, e.g., those for server-based local area networks (LAN), Internet and intranet use. These new applications are often tested prior to commercial implementation because the user perception of how well the server/client interaction works is directly related to the success or failure of the system. A major factor in the design of these systems is the capability of the server to provide responses in adequate time to prevent user frustration. For example, Web browser technology for use on the Internet permits a user to click on hyperlinked text, in order to jump from one Web site to the next. Some studies show that more than one-third of these attempts to jump between sites fail because either the server is unavailable or the transfer takes too much time. The user has opportunities to go to other sites, and many will not wait much longer than thirty to sixty seconds. Thus, it is important to ascertain server response rates, as well as to test the functionality of the server application under load.

High volume servers for use in the field of electronic commerce and the like are correspondingly expensive due to the need for increased capacity. The available communications bandwidth may be shared among all clients, but there inevitably comes with success of the system a need for an upgrade to provide better telecommunications and server capacity. The server owner may wish to design for criteria that best correspond to the owner's business needs, e.g., an average use or a peak use. While it may be possible to provide for the anticipated needs and estimate the associated costs based upon rules of thumb, no certainty exists as to the adequacy of the planned implementation until such time as the server is actually put to the test under conditions of actual or simulated load.

One way to put the server under test is to permit actual users to access the server in a laboratory that is equipped with computers and communications devices. This type of testing process is costly and only lends itself well to systems that are intended to handle small volumes of communications. A sufficient number of users must be physically present to connect to the server for test purposes. For example, in addition to the required warehouse or office space, two hundred users are provided with hardware, and the machines are all individually configured for purposes of each test. A test script or test scripts are written for each user to step through while interacting with the server. A test director or conductor is required to synchronize the testing.

Due to the limitations and difficulties of laboratory testing, conventional software and hardware tools have been developed for purposes of server stress and performance testing. These tools can provide repetitive responses in a manner that simulates a client interacting with the system, but there are tremendous problems in forcing one of these tools to behave as simultaneous multiple clients that each provide correspondingly different responses at different points of interaction with the server. A leading one of these performance testing tools is Loadrunner[1], which is commercially available from Mercury Interactive located in Sunnyvale, Calif. This software has advanced features that facilitate the generation of a new virtual user through a new virtual user utility; however, manual or other intervention is required to record a new virtual user whenever adding or deleting fields from client images. This need makes it nearly impossible to perform large volume interactive server testing because the testing script falls out of synchronization with the virtual client image due to the need to record a new virtual user each time a field is added or deleted from the client image.

[1] Loadrunner is a trademark of Mercury Interactive located in Sunnyvale, Calif.

It remains a problem in the art to provide server load testing while simulating multiple applications and/or multiple clients running on one server.

SUMMARY OF THE INVENTION

The present invention overcomes the problems outlined above and advances the art by providing an enhanced virtual load testing system that facilitates server load testing while simulating multiple applications and/or multiple clients running on one server.

The virtual load testing system includes a virtual user generator that is configured to generate one or more virtual users. A message builder is operably configured to store and retrieve test data for use by the virtual users. The message builder operates in combination with the virtual user generator to populate respective virtual users that are generated by the virtual user generator with corresponding actions. Each action includes one or more sequential messages that operate in combination to provide a server transaction scenario for communications involving the virtual users. The virtual user generator is configured to access the messages in performing interactive server load testing operations where each virtual user is configured as a server client that is capable of delivering responses corresponding to at least one of the actions.

In preferred embodiments, the virtual user generator includes a program interface to a commercially available server load testing package, such as Loadrunner. Input devices are used to provide the system with test design information that is configured in correspondence with a predetermined server application. The information may be stored and recalled for later use to perform automated testing of the predetermined server application, and the testing may be performed across a variety of telecommunications protocols, such as HTTP and other Internet transfer protocols.

The stored message data is preferably accessed by a database having a data structure that includes linked action tables, message tables, record tables, and field tables that, in combination, contain rules for creating server transaction scenarios for each of the virtual users. This data structure more preferably has a hierarchical data structure including, in descending order, the action tables, the message tables, the record tables, and the field tables that provide rules for constructing messages. A second group of data is used for populating messages as directed by the rules.

The system is operated according to a method including the steps of generating one or more virtual users, retrieving stored test data for use by the virtual users, populating respective virtual users with actions derived from the stored test data, wherein each action includes one or more sequential messages operating in combination as a server transaction scenario for communications involving the virtual users, and performing interactive server load testing operations with each virtual user configured as a server client capable of delivering responses corresponding to at least one of the actions.

Software that embodies machine instructions for accomplishing the method is provided as a computer readable form. The machine instructions are operable for use in server load testing operations. Accordingly, the machine instructions include means for generating one or more virtual users, means for retrieving stored test data for use by the virtual users, means for populating respective virtual users with actions derived from the stored test data, wherein each action includes one or more sequential messages operating in combination as a server transaction scenario for communications involving the virtual users, and means for performing interactive server load testing operations with each virtual user configured as a server client capable of delivering responses corresponding to at least one of the actions. Computer readable forms include printed indicia that can be read by optical character recognition; magnetic data storage media including hard disks, floppy disks, and magnetic tape, optical storage media, RAM, ROM, and any other form of storing data for machine use.

DETAILED DESCRIPTION OF THE INVENTION

System Architecture And Operational Overview

Figure 1:
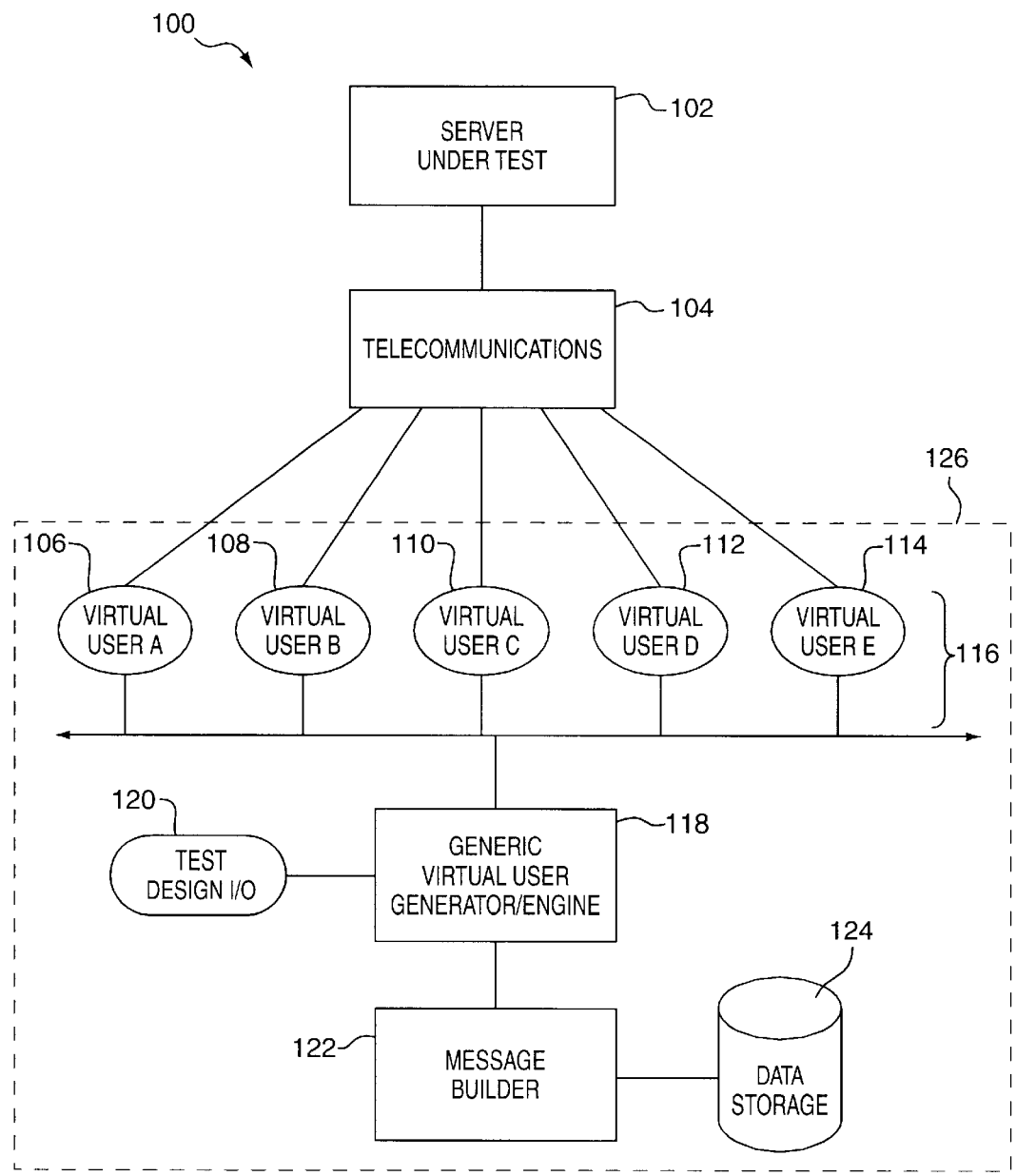
FIG. 1 is a schematic block diagram showing functional components of a server load testing system 100 according to the present invention.

FIG. 1 is a schematic block diagram representing functional components of a server load testing system 100 according to the present invention. These functional components combine software and hardware to simulate a user load for purposes of testing a target server, i.e., server under test 102, which is connected to a telecommunications system 104. While FIG. 1 shows the components of system 100 as separate units, in practice equivalent functional units may be combined, disassembled, interchanged or distributed, with regard to other system components, and this all occurs within the scope of the originally intended machine function.

The server under test 102 may be any server that is intended for use on any network, and this network is preferably the Internet. Therefore, the telecommunications system 104 is preferably the Internet together with any devices, such as modems or dedicated access lines, that are needed to connect the server under test 102 with the telecommunications system 104. Alternatively, the telecommunications system 104 may be a conventional LAN or intranet, as well as any combination of hardware and software that is useful in mimicking or synthesizing a virtual telecommunications system. The server under test is configured for operations according to the needs of a plurality of virtual clients or virtual users 106, 108, 110, 112, and 114, which in combination form a virtual user array 116 containing any number of virtual users or virtual clients.

The virtual users or virtual clients 106–114 may be of any type or function. For example, the virtual user array 116 may comprise servers connecting to a server under test 102 where the server under test 102 is a higher capacity server or switching device. Alternatively, the virtual users 106–114 may be retail or wholesale customers where the server under test 102 hosts an electronic business or information site. The virtual users 106–114 are preferably simulated user workstations. The server under test 102 may host a plurality of such sites or perform multiple functions such that the virtual users 106–114 are clients of different application programs which are hosted by server under test 102, and the operation of all of these programs may be tested simultaneously on the server under test 102.

A generic virtual user engine 118 is the core of the server load testing system 100. An example of a generic virtual user engine 118 is the Loadrunner application, as previously described, coupled with custom software to accomplish I/O for the package together with improved functionality as described below.

The function of the generic virtual user engine 118 is to produce the virtual user array 116 according to test design specifications. The generic virtual user engine 118 may create and decommission multiple users 106–114 during the course of any test. The test design specifications are input by test design I/O devices 120, which may include such devices as data entry keyboards, optical scanners, optical storage and retrieval devices, magnetic storage and retrieval devices, and voice recognition devices. The generic virtual user engine 118 operates on these test design specifications to call for reports from a message builder 122 which, in turn, retrieves information or data that is stored in a data storage device 124. The message builder 122 is typically a database program and, while the database program can be a hierarchical databasing application, a relational database, lookup table or any other form of storing information may be used for purposes of the invention. Oracle[2] has been used to build a working model of the message builder 122.

[2] Oracle is a trademark of Oracle Corporation located in Redwood Shores, Calif.

The generic virtual user engine 118 uses the reports that are generated by the message builder 122 to each provide responses to the server under test through one or more of the virtual users 106–114. The generic virtual user engine 118 is preferably capable of varying the number, frequency and information transfer rate of these reports, as well as the number of virtual users in the virtual user array 116 over time according to the test design specifications.

The elements of FIG. 1, including the virtual user array 116, generic virtual user engine 118, test design I/O devices 120, message builder 122, and data storage devices 124, are normally combined into a single test server 126, but may also be found in a distributed architecture across any group of networked devices.

A load test may be specified as an executable script in Unix with the result that an entire load test may be performed using a single executable file or script. The script is run by specifying the name of the executable script, a load parameter, and the distribution of scenarios over the number of virtual users that take part in the test. This information may be supplied in the form of a matrix. Messages are built using the data that is supplied according to the matrix, and a command line provides the data to one or more predetermined virtual users.

Data Structure

Figure 2:
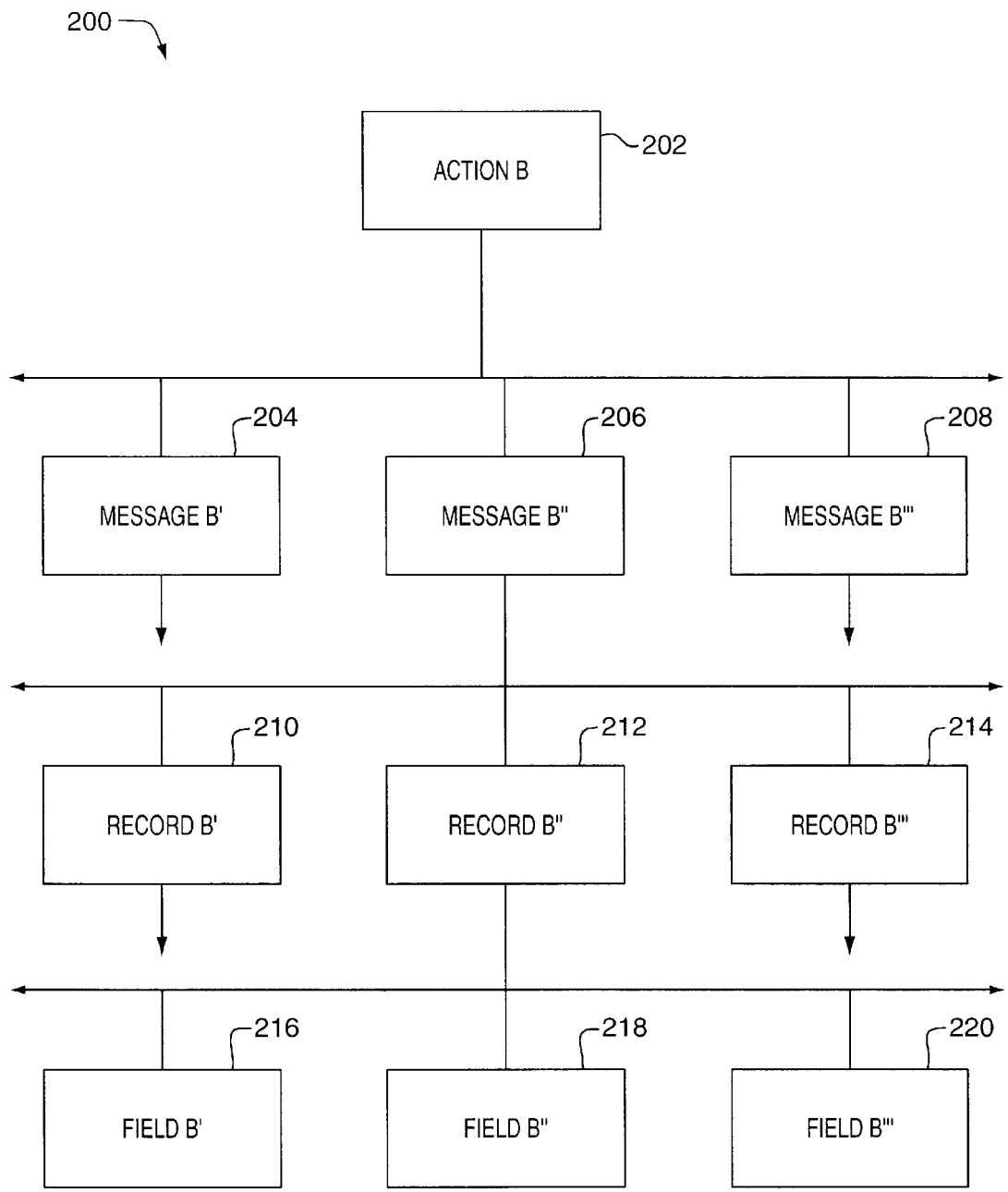
FIG. 2 is a hierarchical data structure of various tables that are used in a databasing application for elements of FIG. 1.

FIG. 2 shows a preferred hierarchical data structure that is used to create a database for data storage on the data storage device 124 for subsequent access by the message builder 122. The database consists of two logical groups of data storage tables including a rules table group and a data table group. The rules table group contains blueprints for building messages. The data table group contains data for populating the fields of the message.

FIG. 2 depicts a rules table group 200 by way of non-limiting example. There are four types of rule tables in the rules table group 200. The rule tables include an action table 202; message tables 204, 206, and 208; record tables 210, 212, and 214; and field tables 216, 218, and 220; which are preferably connected with a hierarchical data structure. There may be any number of tables at any level of the hierarchy. As shown in FIG. 2, the hierarchy is expanded under a single action 202 to illustrate the hierarchical data structure for a single action table.

The action table 202 is at the top of the hierarchy. Each action corresponds to a message that the generic virtual user 118 has queried or called upon the message builder 122 to build. The combined action table 202 defines a groups of messages that combine in sequence to make a scenario. A database record exists in the action table 202 for each message of a scenario. The columns of each action table with a description of each include:

ACTION TABLE COLUMN DEFINITIONS

| Column # | Column Name | Type | Size | Description |
|---|---|---|---|---|
| 1 | Action Name | String | 20 | The scenario name |
| 2 | SeqNum | Int | 3 | Number used in ordering actions |
| 3 | Message Name | String | 10 | The name of the message |
| 4 | Message IO | String | 1 | 'S' for send or 'R' for receive |
| 5 | Test Name | String | 20 | Usually the associated SR number |

Entries in the message tables 204–208 describe the format of the message corresponding to the action. The columns of each message table with a description of each include:

MESSAGE TABLE COLUMN DESCRIPTIONS

| Column # | Type | Size | Size | Description |
|---|---|---|---|---|
| 1 | Message Name | String | 20 | The name of the message |
| 2 | SeqNum | Int | 3 | Used to order the records of a message |
| 3 | Element Type | String | 2 | 'RR' for reply record, 'R' for record, 'F' for field |
| 4 | Element Name | String | 30 | Name of the record or field |
| 5 | Test Name | String | 20 | Usually the associated SR number |

In the table above, RR indicates that the source of this item is an entire record from a previously received response message. In this case, the Element Name column would contain <message>,<occurrence>,<record>, where <message> is the name of the response message, <occurrence> indicates which of the responses are associated with this name, and <record> is the name of the record within this response message.

Each entry in the message tables 204–208 has further entries in at least one of the record tables 210–214 that provide additional details about the message format. Each record table defines groups of records and fields that make up a record. A database record exists in each record table for each grouping of fields or single field of a record. The columns of each record table with a description of each include:

RECORD TABLE COLUMN DESCRIPTION

| Column # | Column Name | Type | Size | Description |
|---|---|---|---|---|
| 1 | Record Name | String | 30 | The name of the record |
| 2 | SeqNum | Int | 3 | Used to order the records of a message |
| 3 | Element Type | String | 1 | 'RR' for reply record, 'R' for record, 'F' for field |
| 4 | Element Name | String | 30 | Name of the field or record |
| 5 | Test Name | String | 20 | Usually the associated SR number |

The field tables 220–224 each contain a description of one individual field of a corresponding message. Thus, each message that is generated by the message builder 122 corresponds to an action based upon a query that is delivered to the message builder 122 from the generic virtual user engine 118. Each ultimate message can be described as a series or sequence of field elements. The columns of each field table with a description of each include:

FIELD TABLE COLUMN DESCRIPTION

| Column # | Column Name | Type | Size | Description |
|---|---|---|---|---|
| 1 | Field Name | String | 30 | The name of the field |
| 2 | Field Length | Int | 7 | Length of field in bytes |
| 3 | Data Source Type | String | 20 | The type of data. Valid entries include "Counter", "InfoCounter", "Constant", "DataStore", "VirtualUserUnique", "Generate", "Reply", and "Binary File". |
| 4 | Data Element | String | 100 | The source of the data |

-continued

FIELD TABLE COLUMN DESCRIPTION

| Column # | Column Name | Type | Size | Description |
| --- | --- | --- | --- | --- |
| 5 | Source Test Name | String | 20 | used to populate the field Usually the associated SR number |

With regard to column 3 in the field table, "Counter" means that the field contains an integer that specifies the number of times to repeat the field or record that is associated with the field table. The Data Element Source element then contains the integer in string format or will be blank, in which case the integer is located in the field or record that is associated with the field table. This counter is included in the outgoing message.

"InfoCounter" means that this field contains an integer that specifies the number of times to repeat the field or record that is associated with the field table. The Data Element Source element then contains the integer in string format or will be blank, in which case the integer is located in the field or record that is associated with the field table. This counter is not included in the outgoing message.

"Constant" means that the Data Element Source contains constant data for this field.

"DataStore" means that the data for this field in found in a data table. The name of the data table is in the format <message>[_<record>[_record. . .]] where <message> is the name of the message that contains this field and, optionally, if the field is part of a record, <record> is the name of the record that contains this field. There can be multiple levels of records down to the field level.

"VirtualUserUnique" means that this field data is unique for a corresponding virtual user. The Data Element Source element then contains the data table name for the table that contains the source for this data. A corresponding virtual user ID (VU ID) is used to index this table for the unique value.

"Generate" means that the data for this field is generated at run time by a specific function. The Data Element Source element then contains the function name for the field. "Generate" fields include date and time fields that must contain the run time and run date.

"Reply" means that the data for this field is located in a previously received response message. The Data Element Source element then contains the information that is necessary to locate the data, and this information is preferably in the format <message>,<occurrence>,<field>, where <message> is the name of the reply message, <occurrence> indicates which of this particular reply message to go to, and <field> is the name of the field to extract from the reply.

"Binary File" means that the data for this field is binary and is located in a file. The Data Element Source element then contains the path for the file.

The second group of data storage tables includes data tables, which contain data corresponding to the field tables 216–220, as required. The message builder 122 retrieves these data tables along with the rules tables. The field tables 216–220 typically contain a data source type, e.g., a DataStore, VirtualUserUnique, or Counter, and the message builder 122 retrieves the actual data corresponding to this data type and writes this data to a flat file to provide a completed message for delivery to the generic virtual user engine. The advantage to this type of system is that the entire database is significantly smaller where the rules tables do not have to contain multiple repetitions of the field data that is stored in the rules tables.

Loading Virtual Users

Figure 3:
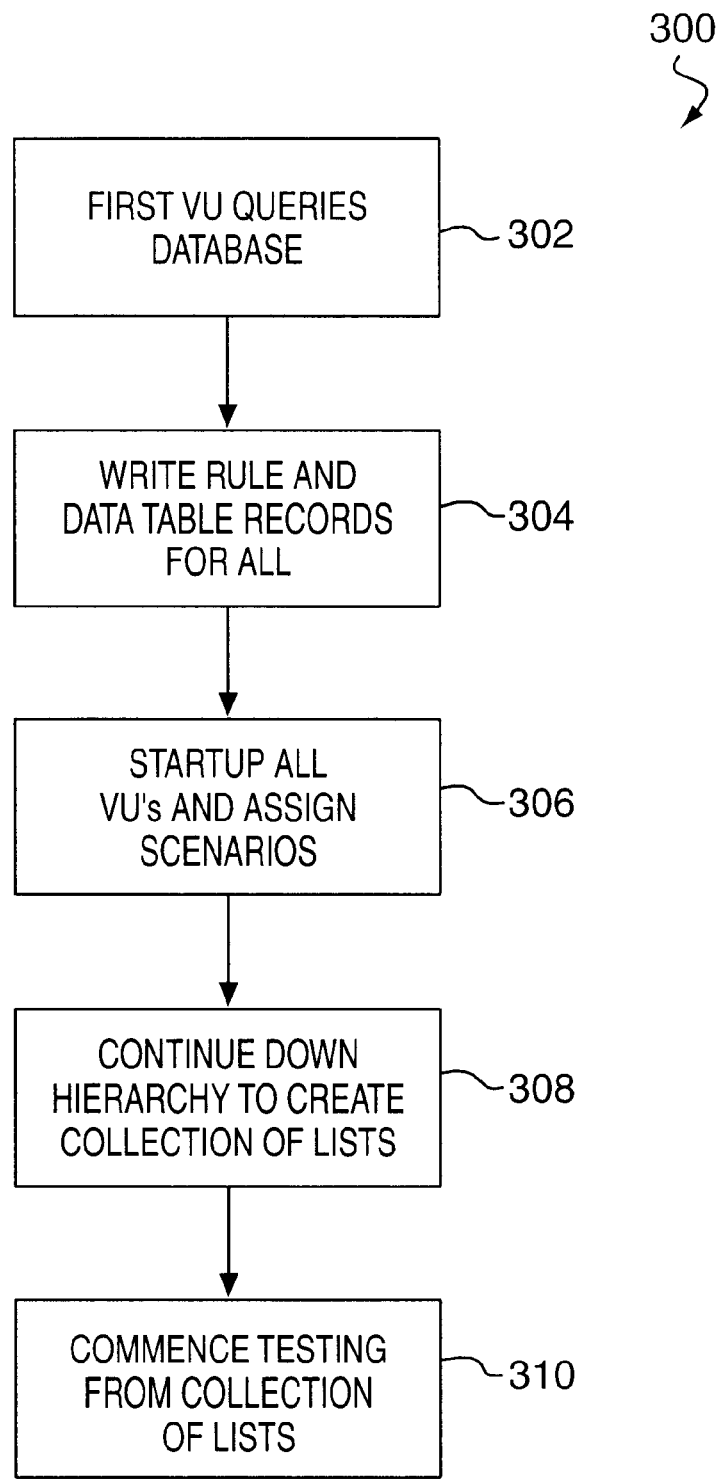
FIG. 3 is a process diagram demonstrating the operation of the system shown in FIG. 1 from startup through to the beginning of load testing operations.

FIG. 3 depicts a preferred process 300 that is used to load the virtual user array 116 (see also FIG. 1). The process 300 is preferred because it avoids having the generic virtual user engine 118 query the message builder 122 to provide scenarios for each of the virtual users 106–114 based upon individual queries for each virtual user. The generic virtual user engine 118 acts as a first virtual user and queries the message builder 122 in step 302 to obtain comprehensive scenarios for each of the virtual users that will be involved in testing the server under test 102. This query results in the production of messages that, together, comprise action scenarios as described above in the data structure heading. In step 304, the generic virtual user engine 118 writes these scenarios as a combination of rule and data tables for all virtual users.

The generic virtual user engine 118 activates all of the virtual users in the virtual user array 116 and assigns each virtual user a scenario based upon the results of step 304, all in step 306. In step 308, the generic virtual user engine 118 continues down the hierarchy of the data structure to create a collection of lists where each list is a flat file that contains the complete messages of a scenario including the combination of rule table data populated with table values. At this point, with the scenarios assigned to corresponding virtual users, and the scenarios being completely formed as a collection of lists, server load testing is ready to commence in step 310. All virtual users are able to read their assigned scenarios into memory from flat files.

Protocols

The operation of server load testing system 100 may vary according to the specific telecommunications protocols that are employed. These well known protocols typically include HTTP and other Internet transfer protocols. A nonlimiting working example is provided below to demonstrate a specific implementation of the server operation using preferred methodology.

HTTP

Hypertext Transmission Protocol is used with Internet or Web-based applications, i.e., a protocol for use between a Web browser and a Web server. HTTP is used as a Web-based server message protocol. This protocol uses TCP/IP and socket HTTP dictating new connections for each client/server transaction. The virtual user reads the IP and port that are used in making this connection from the data storage devices 124 using the message builder 122. The virtual user client establishes a socket connection with the web server, sends a request, polls for a response, receives a response, then breaks the connection.

Timers in Each Virtual User According to Protocol

The generic virtual user engine 118 is capable of recording elapsed times to perform functions or to respond as directed by each virtual user. These elapsed time measurements are critical to determining the performance of the server under test 102 while it is running under a load, i.e., with multiple virtual users of the virtual user array 116 being active on the server under test 102. Response times for the respective virtual users are recorded independently of one another. The recordation of time differs according to the protocol that is being employed. The HTTP protocol is used as a nonlimiting example.

HTTP Timing

The provision of a new connection being established for each transaction in the HTTP protocol necessitates use of the "Connect" timer and the <message> timer. The virtual user tells the generic virtual user engine to start the "Connect" time, establishes a connection with the server under test 102, and instructs the generic virtual user engine to stop the connect timer once the message is received. The virtual user tells the generic virtual user engine 118 to start the <message> timer, sends the request message to the server under test 102, and begins polling for a corresponding response message until bytes are received that are terminated by a double new line character sequence or a time out occurs. If the virtual user does receive a double new line terminated message, then the message is pared for the length in bytes for the remainder of the response. The virtual user again polls for the remainder of the response until the expected length is received or until a timeout occurs.

System Operation to Construct Messages and Action Scenarios

Figure 4:
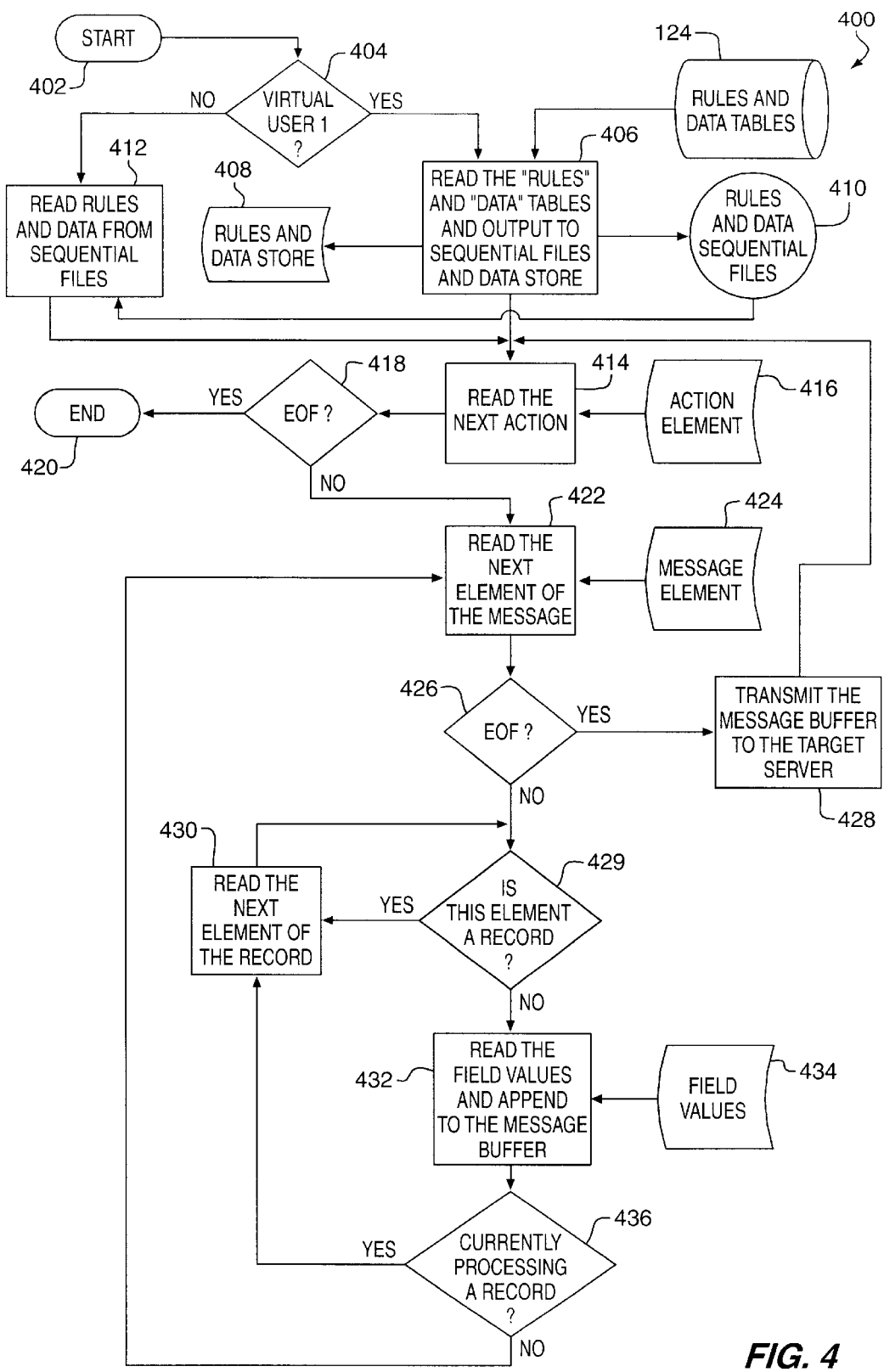
FIG. 4 is a process diagram demonstrating the operations of a message building agent for use in the FIG. 1 system.

FIG. 4 is a process diagram showing the operation of the server load testing system 100 according to process 400 for the creation of messages. Process 400 begins in step 402 when the process is started pursuant to a test request by personnel who are performing server load test operations. In step 404, the generic virtual user engine 118 determines the virtual user ID number (VUID). If VUID=1, then the generic virtual user engine 118 causes the message builder 122 to read the rules tables and the data tables from data storage device 124, and the extracted data is written to a sequential file during step 406 to provide a rules and data store 410 from which other virtual users can read.

Access of the sequential files in step 412, whether step 412 is achieved following steps 406 or 404, is followed by a reading of the first action of the sequential files in step 414 to provide an action element 416. Step 418 performs a query whether the end of the sequential file defining the scenario has been reached. If yes, then the process terminates in step 420. If no, the message builder reads the next element of the message table in step 422 to obtain a new message element. Step 426 queries whether the end of file has been reached for the message elements. If yes, the message builder 122 in step 428 transmits the completed message through the generic virtual user engine 118 to a predetermined virtual user in the virtual user array 116 and ultimately to the server under test 102. Subsequent to step 428, the message builder 122 is free to repeat steps 414 to 426 as before. If the query result in step 426 is no, a subsequent query is made in step 428 to determine whether the message element is a record from a record table as defined above. If yes, then step 430 entails reading the next element of the record from the record table. If no, then step 432 entails reading the field values and appending them to the message buffer to obtain field values 434. Step 436 queries whether the message builder 122 is currently processing a record or a field value. If a record is being processed, step 436 is followed by step 430 for a repetition of steps 428–436. If no record is being processed, then step 436 is followed by step 422 for a repetition of steps 422 to 436.

Completion of the process 400 in step 420 provides a plurality of scenarios in the form of sequential flat files of action elements for the generation of messages to the server under test 102.

Figure 5:
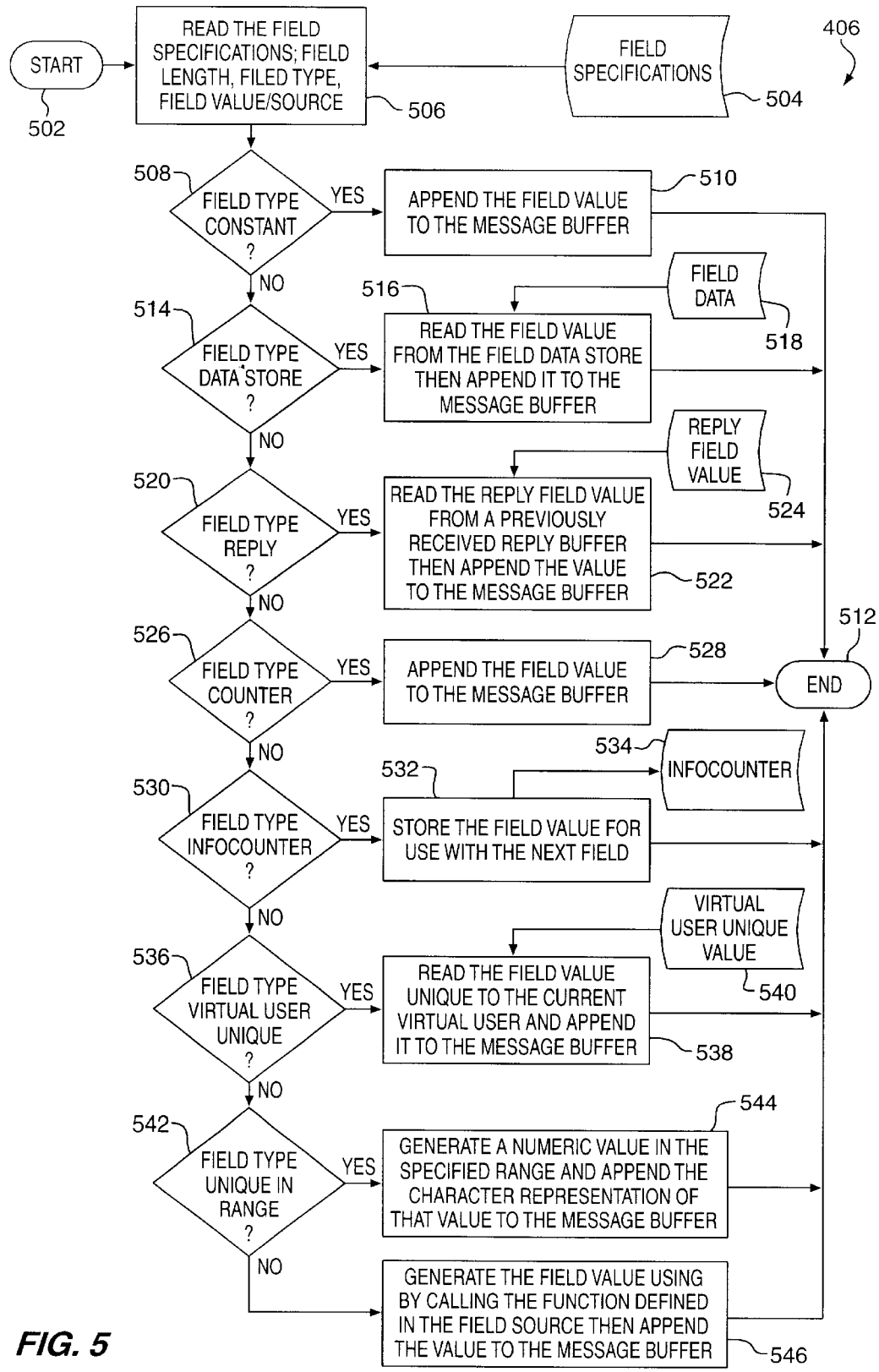
FIG. 5 is a process diagram demonstrating additional aspects of the operations of a message building agent for use in the FIG. 1 system.

FIG. 5 is a process diagram of a process 500 showing operation of the message builder 122 in building scenarios from the sequential files that are provided according to process step 406. Process step 406 begins in step 502 at the prompting of personnel who are actively engaged in server load testing operations. The message builder 122 reads field specifications 504 in step 506 where the field specifications include field length, field type, field value and field source.

Step 508 queries whether the field data type is a constant. If yes, the field value is appended to the message buffer in step 510 and step 406 terminates instep 512. If no, step 514 queries whether the field type is a data store.

Step 514 queries whether the field type is a data store. If yes, in step 516 the field data value 518 is read from the sequential file and appended to the message buffer. If the query result in step 514 is no, then step 520 queries whether the field data type is a reply. If yes, step 522 reads the reply field value 524 from a previously received reply buffer and appends the value to the message buffer prior to termination of step 406 in step 512. If no, step 526 queries whether the field data type is a counter. If yes, step 528 appends the field value to the message buffer and step 406 terminates in step 512.

Step 530 queries whether the field data type is an Info-counter. If yes, step 532 stores the field value as an Info-counter 534 for use with the next field and step 406 terminates in step 512. If no, step 538 queries whether the filed data type is a virtual user unique.

Where the query result in step 536 is yes, step 538 reads a field value 540 that is unique to the current virtual user and appends this value to the message buffer. In this instance, step 512 terminates in step 512. Where the query result is no, step 544 queries whether the field data type is one that is unique in the range of data. If yes, step 544 generates a numeric value in the specified range, e.g., as by using a random number generator, and appends the character representation of that value to the message buffer. Step 406 then terminates in step 512. Where the query result from step 542 is no, the message builder 122 generates a field value in step 546 by calling a function that is defined in the field source, and appends this value to the message buffer. Step 406 then terminates in step 512.

Those skilled in the art will understand that the preferred embodiments described above may be subjected to apparent modifications without departing from the true scope and spirit of the invention. The inventors, accordingly, hereby state their intention to rely upon the Doctrine of Equivalents, in order to protect their full rights in the invention.

We claim:

1. A server load test system for use in testing server operations under a simulated actual load, comprising:

a virtual user generator configured to generate one or more virtual users;

a storage system configured to store a rules table and a data table;

a message builder in communication with the virtual user generator and the storage system, with the message builder being configured to retrieve a server test action for a virtual user of the one or more virtual users from a test design specification, retrieve a rule set for the server test action from the rules table, form one or more server test messages for the server test action according to the rule set, retrieve test message data components from the data table according to the rule set, and insert the test message data components into the one or more server test messages according to the rule set in order to form a complete server test message set for the server test action and for the virtual user.

2. The system of claim 1, with the storage system comprising a database, with the database including a data structure comprising linked action tables, message tables, record tables, and field tables that, in combination, contain rules for creating server transaction scenarios for each of said virtual users.

3. The system of claim 1, wherein the rule set and the test message data components are shared between virtual users of the one or more virtual users.

4. The system of claim 1, further comprising the message builder iteratively processing the test design specification in order to generate all actions for the one or more virtual users.

5. The system of claim 1, further comprising performing interactive server load testing operations with each virtual user of the one or more virtual users being configured as a server client capable of transmitting one or more server test actions.

6. The system of claim 1, further comprising performing interactive server load testing operations with each virtual user of the one or more virtual users being configured as a server client capable of transmitting one or more server test actions, wherein performing the automated server load testing operations includes testing a server application across a variety of telecommunications protocols.

7. The system of claim 1, further comprising:

interfacing with a commercially available server load testing package, with the server load testing package including the virtual user generator; and performing interactive server load testing operations with each virtual user of the one or more virtual users being configured as a server client capable of transmitting one or more server test actions.

8. The system of claim 1, with retrieving the server test action, retrieving the rule set, and retrieving the test message data components comprising;

reading the server test action from the test design specification; and recalling the rule set and the test message data components from a database.

9. The system of claim 1, wherein user information for each virtual user of the one or more virtual users is stored as individual test message data components and wherein a new virtual user is added by adding a new virtual user information.

10. The system of claim 9, with the user information comprising a virtual user address.

11. A method of performing server load testing through use of virtual users, said method comprising:

generating one or more virtual users;

retrieving a server test action for a virtual user of the one or more virtual users from a test design specification;

retrieving a rule set for the server test action;

forming one or more server test messages for the server test action according to the rule set;

retrieving test message data components according to the rule set; and inserting the test message data components into the one or more server test messages according to the rule set in order to form a complete server test message set for the server test action and for the virtual user.

12. The method of claim 11, wherein the rule set and the test message data components are shared between virtual users of the one or more virtual users.

13. The method of claim 11, further comprising iteratively processing the test design specification in order to generate all actions for the one or more virtual users.

14. The method of claim 11, further comprising performing interactive server load testing operations with each virtual user of the one or more virtual users being configured as a server client capable of transmitting one or more server test actions.

15. The method of claim 11, further comprising performing interactive server load testing operations with each virtual user of the one or more virtual users being configured as a server client capable of transmitting one or more server test actions, wherein performing the automated server load testing operations includes testing a server application across a variety of telecommunications protocols.

16. The method of claim 11, further comprising:

interfacing with a commercially available server load testing package, with the server load testing package including the virtual user generator; and performing interactive server load testing operations with each virtual user of the one or more virtual users being configured as a server client capable of transmitting one or more server test actions.

17. The method of claim 11, with retrieving the server test action, retrieving the rule set, and retrieving the test message data components comprising;

reading the server test action from the test design specification; and recalling the rule set and the test message data components from a database.

18. The method of claim 11, wherein user information for each virtual user of the one or more virtual users is stored as individual test message data components and wherein a new virtual user is added by adding a new virtual user information.

19. The method of claim 18, with the user information comprising a virtual user address.

* * * * *